Feb. 4, 1964  G. ERISMANN ETAL  3,120,098
BEARING FOR TIMEPIECES

Filed Aug. 6, 1962  4 Sheets-Sheet 1

Feb. 4, 1964　　　G. ERISMANN ETAL　　　3,120,098
BEARING FOR TIMEPIECES
Filed Aug. 6, 1962　　　　　　　　　　　　　　4 Sheets-Sheet 4

United States Patent Office 3,120,098
Patented Feb. 4, 1964

3,120,098
BEARING FOR TIMEPIECES
Gerard Erismann, Charly Maurer, and Aimé Rossel, Bern, Switzerland, assignors to Erismann-Schinz S.A., La Neuveville, Switzerland, a firm of Switzerland
Filed Aug. 6, 1962, Ser. No. 215,083
Claims priority, application Switzerland Aug. 7, 1961
4 Claims. (Cl. 58—140)

There is nowadays a prevailing tendency in the watch-making industry to replace the conventional through-stone and endstone independent of each other by a single compound element including a support into which the throughstone is driven, while the endstone is fitted removably therein. In such a case, the endstone is held in position by a removable spring which it is often difficult to position by reason of its small size, or else, by tongues provided on the endstone and adapted to engage the lower surfaces of projections formed in the support, which arrangement leads to giving an intricate shape to the compound element.

Our invention has for its object to remove these drawbacks and accordingly the bore in the support is provided with two superposed annular grooves each of which is engaged by an annular bearing surface on the angularly shiftable endstone, one of said bearing surfaces at least being arranged eccentrically with reference to its groove, so that a rotation of said throughstone brings it into a position for which each of the bearing surfaces is wedged inside its groove.

Thus, the support and the endstone may be given a simple shape, their periphery being bounded merely by annular surfaces, while the securing of the endstone in the support is obtained by the wedging ensured by the differences in diameter between said surfaces.

Figure 1:
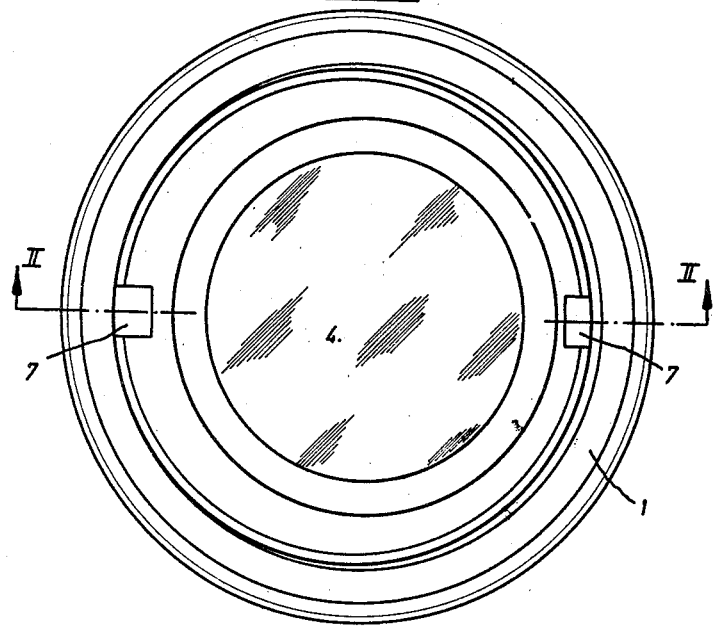
Figure 2:
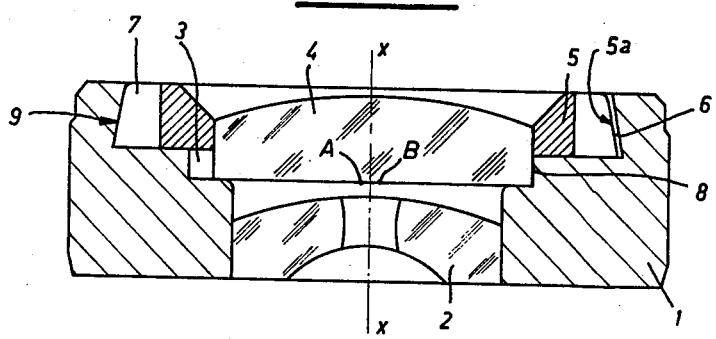
Figure 3:
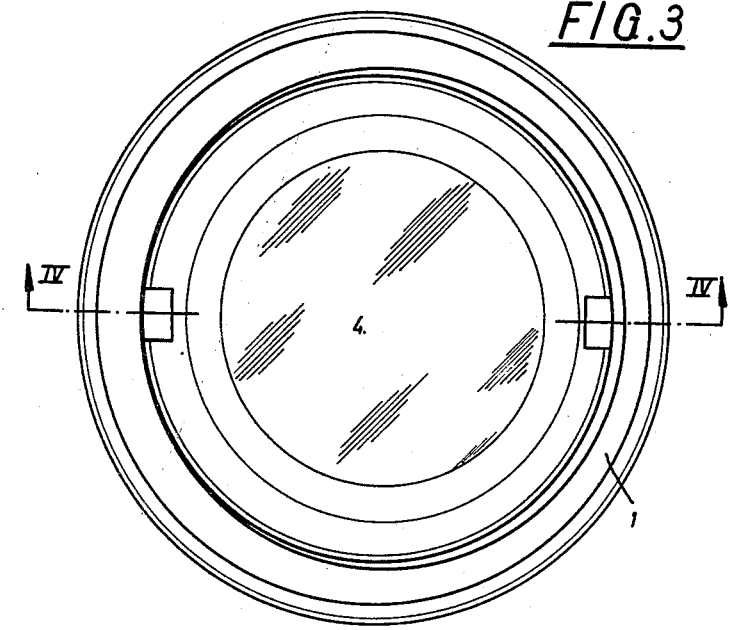
Figure 4:
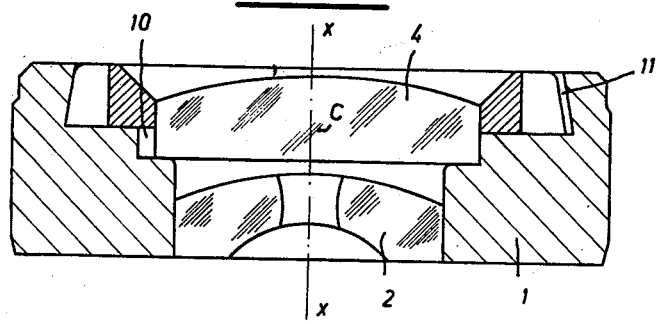
Figure 5:
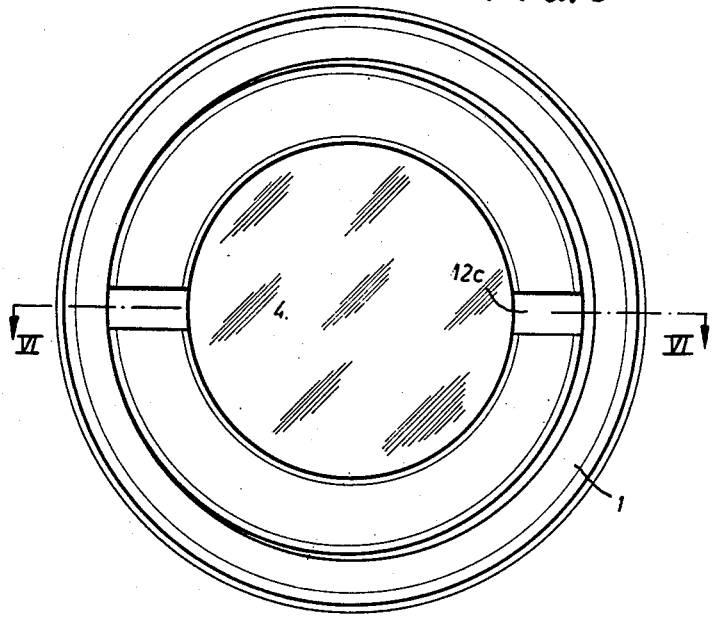
Figure 6:
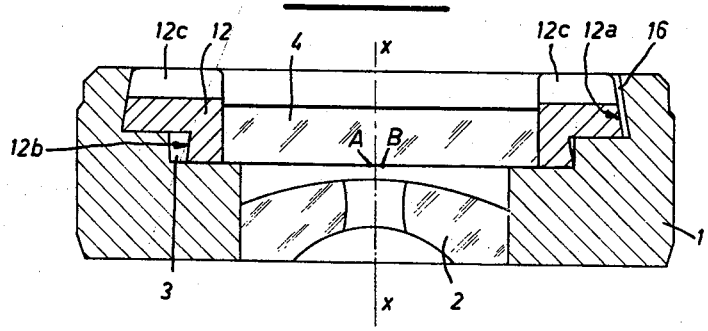
Figure 7:
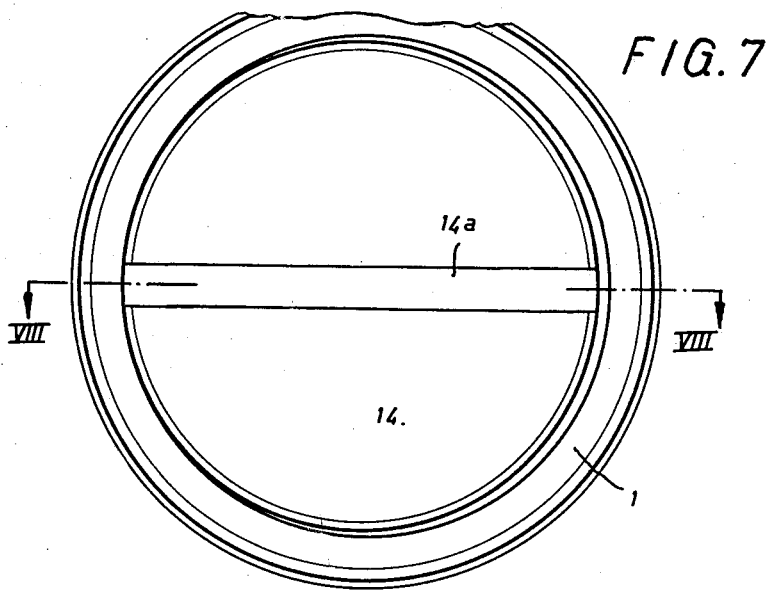
Figure 8:
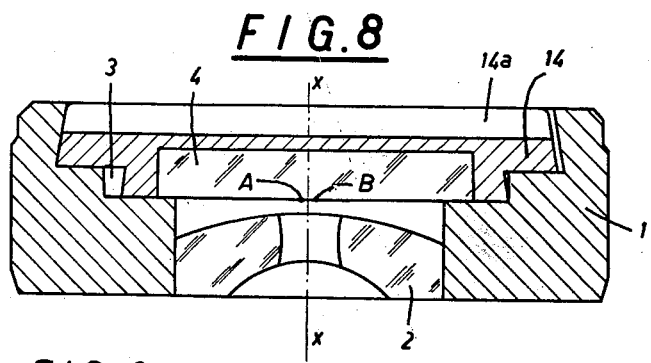
Figure 9:
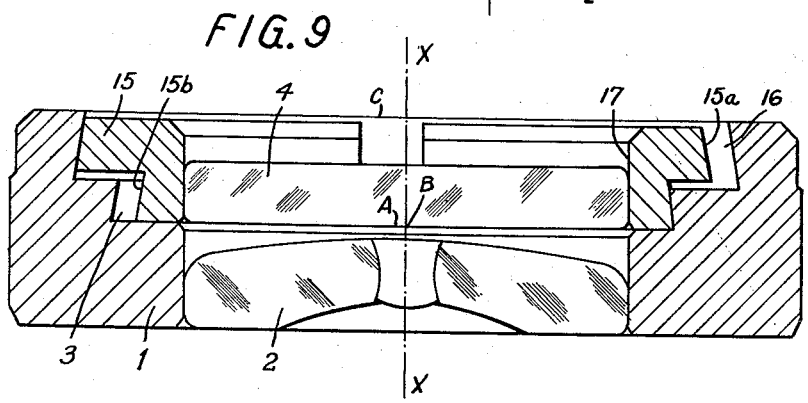

The accompanying drawings illustrate, by way of example, five different embodiments of our invention. In said drawing:

FIG. 1 is a plan view of the first embodiment,
FIG. 2 is a cross-section through line II—II of FIG. 1,
FIG. 3 is a plan view of the second embodiment,
FIG. 4 is a cross-section through line IV—IV of FIG. 3,
FIG. 5 is a plan view of a third embodiment,
FIG. 6 is a cross-section through line VI—VI of FIG. 5,
FIG. 7 is a plan view of the fourth embodiment,
FIG. 8 is a cross-section through line VIII—VIII of FIG. 7,
Lastly, FIG. 9 is an axial cross-section of the fifth embodiment. The embodiment illustrated in FIGS. 1 and 2 includes a bored jewel support 1 adapted to be secured in a plate or bridge of a timepiece. The throughstone 2 is driven into said support. The latter is provided with a groove 3 arranged eccentrically with reference to the axis X—X of its bore, the center of said groove being located at A. The endstone 4 is driven inside a bezel 5 bounded by an annular bearing surface 5a fitted with a slight radial clearance inside a further groove 6 formed in the support, which groove is coaxial with the bore of said support. Now, the endstone 4 is driven into the opening of the bezel 5 which is arranged eccentrically with reference to the axis X—X of the bezel, the center of said opening being located at B. The bearing surface of the bezel 5a and the cooperating surface of the groove 6 form geometrically part of frusto-cones of which the apices lie above the support, as seen on the drawings. The bezel 5 is provided on its upper surface with two diametrically opposed notches 7. For positioning the end-piece in said support, it is laid with the cooperating bezel 5 inside the bore in the support 1 in a position lying for instance at 180° from the position illustrated in FIG. 2, after which the compound member 4—5 is angularly shifted by a tool engaging the notches 7 in the bezel until the eccentric lateral surface or bearing surface 8 of the endstone is wedged against the cooperating section of the wall of the groove 3 on the right-hand side of the latter, as illustrated in FIG. 2. Said wedging produces a slight shifting towards the left-hand side of the drawings of the compound member 4—5, until the lateral surface 9 on the bezel engages the cooperating section of the groove 6 on said left-hand side, whereby the above-referred to contacting frusto-conical sections oppose any outward shifting of the bezel. The embodiment illustrated in FIGS. 3 and 4 differs from that which has just been described through the fact that the inner groove 10 formed in the support 1 is coaxial with the axis X—X of the bore in the latter, whereas, in contradistinction, the outer groove 11 formed in the support is arranged eccentrically with reference to said axis, its center being located at C. The endstone is driven into a groove or opening of the bezel of which the center is also located at C, the endstone being thus concentric with the bezel.

In the Roskopf types of watches, the endstone and its bezel corresponding to any of the arrangements disclosed, may be executed as a unit made of tempered steel for instance.

Turning now to the embodiment illustrated in FIGS. 5 and 6, it includes a bored jewel or support 1 adapted to be secured in a plate or bridge of a timepiece. The throughstone 2 is driven into said support which is provided with a groove 3 arranged eccentrically with reference to the axis X—X of the bore, its center being located at A, while a further outer groove 16 is coaxial with said axis. The endstone 4 is driven into the opening of the bezel 12 fitted in said groove 16, said opening being optionally eccentric with reference to said axis and having its center at B. Said endstone is provided with two bearing surfaces of which one, 12a, is fitted as mentioned in the groove 16 of the support, while the other, 12b, is fitted in the groove 3 and is arranged eccentrically with reference to the latter, its center being located at B. The bezel 12 is constituted by an annulus extending throughout the height of the endstone 4 and it is provided on its upper surface with two diametrically opposed notches 12c.

The endstone is positioned by laying said endstone 4 and its bezel 12 inside the support 1, for instance in a position at 180° with reference to the position illustrated in FIG. 5, following which and by means of a tool engaging the notches 12c, the compound member 4—12 is caused to turn so as to enter the position illustrated in FIG. 5, for which position the two bearing surfaces of the bezel are wedged inside the cooperating grooves at diametrically opposed points. The embodiment illustrated in FIGS. 7 and 8 differs from that illustrated in FIGS. 5 and 6 solely by the fact that the endstone 4 is fitted in a cap-shaped bezel 14 which, as in the case of the preceding embodiment, extends throughout the height of the endstone; the upper surface of the cap is provided with a diametrical slot 14a which allows the introduction of a tool for angularly shifting the bezel and endstone unit.

FIG. 9 illustrates a fifth embodiment wherein 1 designates again the jewel support, 2 the throughstone and 4 the endstone fitted in a bezel 15 extending throughout the height of the endstone and projecting above the latter. The bezel 15 is provided with two bearing surfaces 15a and 15b of which the former is adapted to turn inside the groove 16 of the support, which groove is coaxial with the axis X—X of the bore in the support while the second bearing surface 15b is adapted to move in the inner groove 5 formed along the periphery of the bore in the support, said groove having an axis eccentric with reference to the bore in the support and passing through A. 17 designates the bore in the bezel inside which the endstone is driven and the center of which, B, is spaced with reference to the center C of the bearing surface 15a. The two bearing surfaces 15a and 15b are bounded by frusto-conical surfaces arranged coaxially and the apices of which lie above the support for the position illustrated in the drawings. Said frusto-conical surfaces cooperate with corresponding frusto-conical surfaces formed by the walls of the grooves 16 and 3.

A tool engaging the bezel is used for turning the endstone and bringing it into the position illustrated in FIG. 9 for which the bearing surface 15b is wedged on the right-hand side of the drawings inside the groove 3, whereas the bearing surface 15a is wedged on the left-hand side inside the groove 16. The frusto-conical shape of the bearing surfaces and of the cooperating grooves prevents any upward movement of the endstone for instance when the end of the balance staff hits the endstone 4.

What we claim is:

1. In a timepiece, a stationary bearing comprising a bored support the bore in which is provided with two inwardly facing peripheral grooves of which one is eccentric with reference to the bore, a throughstone fitted in the outwardly facing end of the bore in the support opposed to the grooves, an endstone system provided with two peripheral annular bearing surfaces arranged eccentrically with reference to each other and revolvably carried in the corresponding peripheral grooves in the support with a slight clearance therebetween to allow upon rotation of the endstone, a wedging of the latter for a predetermined angular position thereof, the side walls of the groove further removed from the throughstone and of the cooperating bearing surface of the endstone system forming frusto-cones, the apices of which lie on the side of the support facing away from the throughstone.

2. In a timepiece, a stationary bearing comprising a bored support the bore in which is provided with two inwardly facing peripheral grooves of which one is eccentric with reference to the bore, a throughstone fitted in the outwardly facing end of the bore in the support, and an endstone system provided with two peripheral annular bearing surfaces arranged eccentrically with reference to each other and revolvably carried in the corresponding peripheral grooves in the support with a slight clearance therebetween to allow upon rotation of the endstone system, a wedging of the latter for a predetermined angular position thereof.

3. In a timepiece, a stationary bearing comprising a bored support the bore in which is provided with two inwardly facing peripheral grooves of which one is eccentric with reference to the bore, a throughstone fitted in the outwardly facing end of the bore in the support, and an endstone system including a stone and a bezel inside which the stone is fitted and which is provided with two peripheral annular bearing surfaces arranged eccentrically with reference to each other and revolvably carried in the corresponding peripheral grooves in the support with a slight clearance therebetween to allow upon rotation of the endstone a wedging of the latter for a predetermined angular position thereof.

4. In a timepiece, a stationary bearing comprising a bored support the bore in which is provided with two inwardly facing peripheral grooves of which one is eccentric with reference to the bore, a throughstone fitted in the outwardly facing end of the bore in the support, and an endstone system provided with two peripheral annular bearing surfaces arranged eccentrically with reference to each other and revolvably carried in the corresponding peripheral grooves in the support with a slight clearance therebetween to allow upon rotation of the endstone system, a wedging of the latter for a predetermined angular position thereof, both bearing surfaces and cooperating grooves being bounded by frusto-conical surfaces of which the apices are all located on the side of the bearing facing away from the throughstone.

References Cited in the file of this patent

FOREIGN PATENTS

| 1,024,736 | France | Apr. 7, 1953 |
| 335,171 | Switzerland | Feb. 14, 1959 |